Jan 6, 1931.  L. WHORTON  1,787,924
PROCESS OF MAKING SOLUTION OF ACETYLSALICYLIC ACID
Filed Oct. 31, 1927
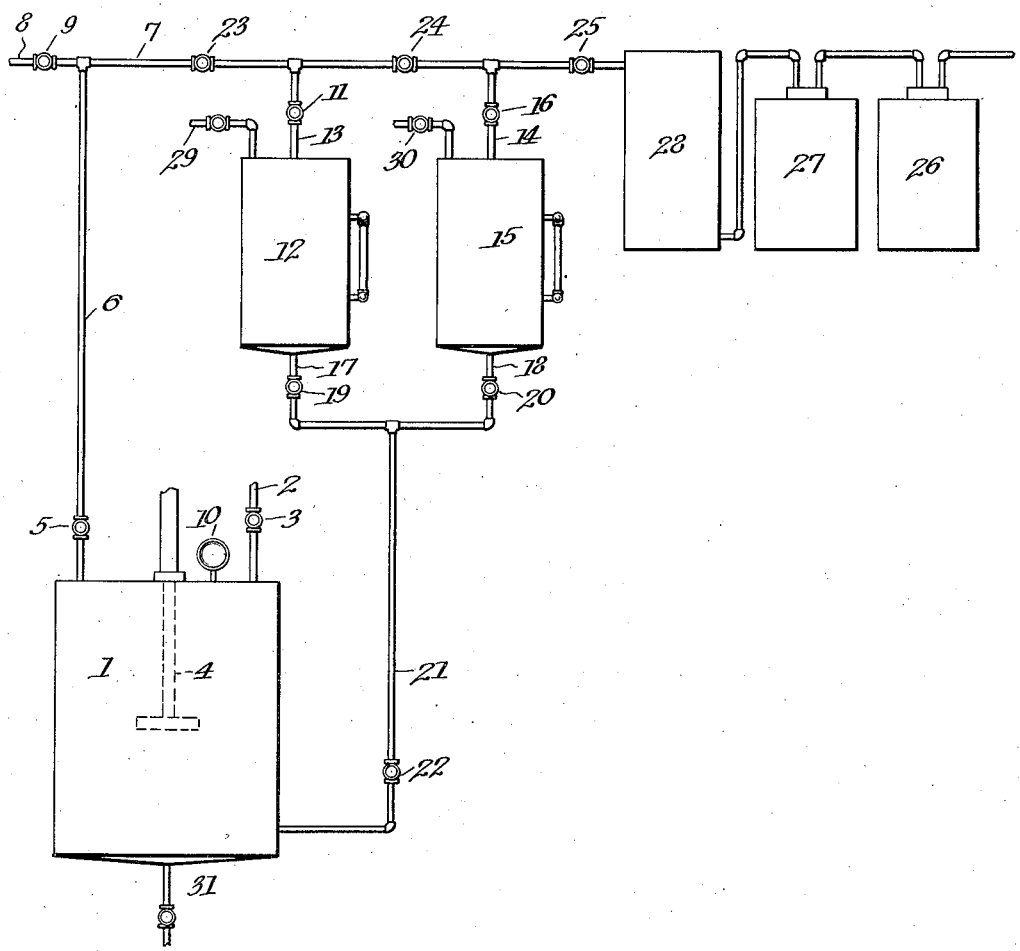
Inventor
Leonidas Whorton Patented Jan. 6, 1931

1,787,924

UNITED STATES PATENT OFFICE

LEONIDAS WHORTON, OF GADSDEN, ALABAMA, ASSIGNOR TO WHORTON PHARMACAL COMPANY, OF GADSDEN, ALABAMA, A CORPORATION OF ALABAMA

PROCESS OF MAKING SOLUTION OF ACETYLSALICYLIC ACID

Application filed October 31, 1927. Serial No. 230,013.

The present invention has for its principal object the production of a stable anhydrous solution of acetylsalicylic acid.

Heretofore the preparation of this material has been impractical because of the difficulty of preventing the acetylsalicylic acid from hydrolyzing and breaking down into acetic acid and salicylic acid.

To avoid this, various solutions of salts of aspirin and elixir of aspirin have been employed.

I have found that acetylsalicylic acid will not hydrolize in a solvent of high proof ethyl alcohol and a high test anhydrous glycerine, equal parts, care being taken that no exposure to moisture or moist air is had till the finished solution is bottled in perfectly dry bottles.

A further object is, therefore, to prepare the solution by a process in accordance with which no moisture or moist air will have access to the materials.

This is accomplished by conducting the process under conditions of substantial vacuum, and employing an aspirating medium of dry pure air.

The invention contemplates a final product of anhydrous acetylsalicylic acid in solution in alcohol and glycerine, and in this form it is bottled under vacuum and will remain stable indefinitely.

In the drawings, the figure is a view of the apparatus which I employ in the preparation of this product.

The mixing tank indicated at 1 is an ordinary glass or porcelain lined closed receptacle having a material supply pipe 2 and a valve 3 whereby acetylsalicylic acid may be supplied to the tank in dry or fluid form. The tank also has arranged therein a suitable agitator 4. Communicating with the tank is a branch 5 having a valve 6, said branch being connected to an air line 7 which communicates with a vacuum pump not shown but which is connected at the end of the extension 8 of the air line, a valve 9 being interposed in the extension. A vacuum gage 10 is provided for the tank 1.

Connected to the air line 7 is a branch 13 which communicates with a chemical tank 12, a suitable valve 11 being interposed in the branch. A similar branch 14 communicates with a second chemical tank 15 and a valve 16 is interposed in the branch. The chemical tanks are provided with branches 17 and 18, having valves 19 and 20, communicating with a pipe 21 whereby chemicals may be passed to the mixing tank 1. A valve 22 is interposed in the pipe 21 to prevent any possibility of leakage when it is not desired to supply chemical to the tank.

Valves 23, 24, and 25 are interposed in the air line one between the mixing tank and the chemical tank 12 and one between the two chemical tanks, and one also between the last chemical tank and the purifying and drying means which will now be described.

This purifying and drying means which is shown at the inlet end of the air line comprises a purifying air tank 26 in which may be contained a twenty-five per cent (25%) solution of potassium hydrate. The air flows through this tank initially and is cleansed of carbon dioxide and other gases. It will be understood that any other purifying material may be employed either in porous condition or pasty condition. Communicating with the purifier is an empty vessel 27 through which the air will be drawn, and wherein will collect and settle out any heavy substances, such as contained particles or dust or moisture. The air so relieved is then drawn into a drier indicated at 28 of any suitable form which is preferably filled with granular calcium chloride, which will absorb any remaining moisture in the air, so that when the valves in the air line are open and the vacuum pump is started, a supply of clean dry air will be drawn through the air line. It will be understood that this dry air is the medium by which the vacuum pump exhausts the mixing tank 1 through the branch 6.

In carrying out the invention a quantity of acetylsalicylic acid sufficient to make a five grain per fluid dram strength solution is placed in the mixing tank, and the vacuum pump is started to exhaust air and moisture from the mixing tank.

In the tank 12, I preferably place high proof alcohol or other suitable solvent for the acetylsalicylic acid which may be supplied as required by means of the conduit 29. In referring to high proof alcohol, commercial ethyl alcohol is high proofed or reduced so that its moisture content is considerably reduced to two per cent or less. The tank 15 is adapted to contain high test anhydrous glycerine or equivalent material miscible with the solvent employed, and this second chemical may as in the case with glycerine also be a solvent for acetylsalicylic acid. The glycerine may be supplied to the tank 15 through the conduit 30.

In the drawings, I have illustrated the chemical tank as being positioned sufficiently above the mixing tank to permit a flow of chemical from each tank to the mixing tank by gravity, but it will be understood that the tanks may be in any convenient position, and the chemical supplied to the mixing tank by pressure, if desired.

While the mixing tank is being exhausted, the valves 11 and 16 in the branches leading to the chemical tanks are closed. To supply chemical to the mixing tank, the valve 9 and the vacuum pump are shut off, and the valve 11 is opened, as well as the valves 22 and 19 leading to the passage 21. An appropriate quantity of alcohol is permitted to flow into the mixing tank and the agitator 4 is preferably operated.

By reason of the communication of the tank 12 with the air line, as the alcohol is removed, the space left in the tank by the lowering of the liquid level will be filled by pure dry air entering from the air line through branch 11. In this manner the alcohol supply in the tank 12 will be maintained substantially free from moisture, and since the dry air is continuously circulating in the air line, there is no opportunity for condensation in the air line with consequent possibility of moisture flowing or being drawn into any of the several tanks.

While the vacuum pump is shut off, the valve 5 may be left open and pure dry air will enter the tank above the material contained therein and maintain the tank dry.

The valve 6, however, may be closed if desired.

When a sufficient quantity of alcohol has been admitted to the tank, the valves 19 and 22 may be shut off as well as the valve 11, and there will be a strata of dry air above the liquid level as stated.

The valve 9 is opened and the vacuum pump operated to exhaust the mixing tank, and the alcohol and acetylsalicylic acid are agitated until solution is complete under conditions of substantial vacuum.

The vacuum pump is then shut off as previously described and glycerine is passed to the mixing tank in the same manner as was the alcohol. It will be understood that pure dry air will replace the glycerine removed from the tank 15 and the strata of dry air will thus maintain the glycerine in its desired anhydrous condition.

The glycerine is preferably fed to the vacuum tank while the solution therein is being agitated although this is not necessary. The solution and glycerine are mixed by means of the agitator to produce the finished product and this step may be accomplished with or without exhaustion of the mixing tank.

The final product which consists of a solution of acetylsalicylic acid in alcohol and glycerine may be drained from the mixing tank through the pipe 31 by way of a closed filter not shown, to a vacuum bottling machine where it is passed into perfectly dry bottles which are automatically corked.

It will be understood that the invention contemplates the preparation of the solution under conditions where there is complete absence of moisture or moist air and thus obviates the possibility that the acetylsalicylic acid may hydrolyze.

It will, moreover, be understood that by employing dry pure air, there is no possibility of condensation in the air line and no chance for moisture to enter either the mixing tank or the chemical tanks. In this manner clean dry air will be maintained above the level of the chemicals in the tanks 12 and 15 to preserve their original uniformity.

The final product is an anhydrous solution of free aspirin or in effect a solution of uncombined aspirin which will not hydrolize on standing and will remain stable indefinitely.

While I have referred to the use of alcohol and glycerine, it will be understood that various equivalents may be employed. Alcohol is a well known solvent for acetylsalicylic acid and glycerine is miscible with the alcohol and is also a solvent for the acetylsalicylic acid. For this reason I prefer these two substances.

In making the solution, sufficient acetylsalicylic acid is placed in the mixing tank to make a five grain per fluid dram solution and equal quantities of alcohol and glycerine are preferably added as the process continues. Of course, a greater or less amount of each of these ingredients may be employed. The glycerine in the present case also has the function of being a soothing agent to counteract the effect of the alcohol. Moreover, the glycerine acts as a diluent and is a very appropriate one because it can be had in practically anhydrous condition, and as stated, will relieve the pungency of the alcohol and acetylsalicylic acid. I found that by adding a proper quantity of the glycerine to the alcohol solution of acetylsalicylic acid, that a more complete solution will be obtained which will remain stable indefinitely.

What I claim is:

1. The process of preparing a stable anhydrous solution of acetylsalicylic acid with glycerine and alcohol in a closed receptacle, which consists in supplying the acid to the receptacle, admitting a quantity of dehydrated alcohol thereto, and forming a solution with the acid, passing a quantity of dehydrated glycerine to the receptacle and agitating the mass, and maintaining the solution under a vacuum during the operation by exhausting with dry air purified so as to be inert with respect to said solution and at all times maintain the receptacle free of moisture.

2. The process of preparing a stable anhydrous solution of acetylsalicylic acid with glycerine and alcohol in a closed receptacle, which consists in supplying the acid to the receptacle, admitting a quantity of dehydrated alcohol thereto, and forming a solution with the acid, passing a quantity of dehydrated glycerine to the receptacle and agitating the mass, and maintaining the solution under a vacuum during the operation by exhausting with dry air purified so as to be inert with respect to said solution and at all times maintain the receptacle free of moisture, and permitting dry air to circulate in the container above the level of the solution when the vacuum is removed.

3. The process of preparing a stable anhydrous solution of acetylsalicylic acid with glycerine and alcohol in a closed receptacle, which consists in supplying the acid to the receptacle, admitting a quantity of dehydrated alcohol thereto from a reservoir, and forming a solution with the acid, passing a quantity of dehydrated glycerine from a reservoir to the receptacle and agitating the mass, and maintaining the solution and also the liquid ingredients in said reservoirs under a vacuum during the operation by exhausting with dry air purified so as to be inert with respect to said solution and the ingredients in said reservoirs and at all times maintain the receptacle and reservoirs free of moisture.

4. The process of preparing a stable anhydrous solution of acetylsalicylic acid with glycerine and alcohol in a closed receptacle, which consists in supplying the acid to the receptacle, admitting a quantity of dehydrated alcohol thereto from a reservoir, and forming a solution with the acid, passing a quantity of dehydrated glycerine from a reservoir to the receptacle and agitating the mass, and maintaining the solution and also the liquid ingredients in said reservoirs under a vacuum during the operation by exhausting with dry air purified so as to be inert with respect to said solution and the ingredients in said reservoirs and at all times maintain the receptacle and reservoirs free of moisture, and permitting dry air to circulate in the receptacle and reservoirs above the level of the solution and above the level of the separate ingredients when the vacuum is removed.

5. The process of preparing a stable anhydrous solution of acetylsalicylic acid with glycerine and alcohol in a closed receptacle, which comprises the step of adding to a solution of acetylsalicylic acid in dehydrated alcohol, dehydrated glycerine and agitating to form the solution, and during the period of operation maintaining a vacuum by exhausting with dry air purified so as to be inert with respect to the solutions and prevent any moisture remaining in contact therewith to avoid hydrolysis of the acetylsalicylic acid.

In testimony whereof I have hereunto set my hand.

LEONIDAS WHORTON.